Patented Jan. 17, 1933

1,894,767

UNITED STATES PATENT OFFICE

EDWARD W. HARVEY, OF NEW BRUNSWICK, NEW JERSEY, ASSIGNOR TO THE BARRETT COMPANY, OF NEW YORK, N. Y., A CORPORATION OF NEW JERSEY

METHOD OF APPLYING AQUA-AMMONIA TO FERTILIZER MIXTURES

No Drawing.   Application filed December 1, 1928.   Serial No. 323,210.

This invention relates to the preparation of mixed fertilizers and particularly to fertilizers containing monocalcium acid phosphate. Superphosphate, double superphosphate or mixtures containing one or both of these materials are examples of such fertilizers.

Superphosphate is a common constituent of fertilizer mixtures, which also usually include nitrogen in a form which is adapted to be assimilated by plants. Aqua ammonia is a readily available and relatively inexpensive source of nitrogen for fertilizer. Ammonia is, moreover, a desirable material for incorporation with fertilizers containing superphosphate because it reacts chemically therewith, neutralizes free acid, and creates sufficient heat to drive off a large part of the free moisture, leaving the mixture in a desirable physical condition.

Unfortunately, the amount of aqua ammonia which can be added to superphosphate is limited under certain conditions because the ammonia tends to convert the water soluble phosphate into "citrate soluble", which, in the presence of an excess of ammonia, reverts into the "citrate insoluble" form and hence becomes unavailable for fertilizing purposes.

It has therefore been proposed to add aqua ammonia to superphosphate but when the aqua ammonia was added in sufficiently large proportion to afford a practicable source of nitrogen, it was found that difficulties were encountered due to the tendency of the phosphate to revert to the "citrate insoluble" form.

It is the object of the present invention to afford a simple and satisfactory method of applying aqua ammonia to fertilizers containing mono-calcium acid phosphate so as to avoid the reversion of the phosphate and to secure the benefit of ammonia in the mixture.

I have discovered that the tendency for reversion of mono-calcium acid phosphate to the "citrate insoluble" form in the presence of ammonia is increased by excessive concentrations of aqua ammonia in reactive contact with the phosphate, that is to say, when the ammonia is not uniformly distributed it acts upon limited portions of the phosphate to cause reversion thereof. By suitable distribution of the aqua ammonia so that excessive concentration thereof is avoided, the tendency for reversion to occur is materially lessened and it is possible to introduce a relatively large proportion of aqua ammonia to superphosphate or other fertilizers containing mono-calcium acid phosphate without prohibitive formation of the undesirable insoluble form of phosphate.

The desired distribution may be effected in various ways, but preferably, I employ a nozzle, spray, or atomizing device which delivers the liquid in a finely divided form, for example, as a mist or fine rain. The aqua ammonia may be introduced to the nozzle or corresponding device from a suitable receptacle adapted, for example, to receive a measured quantity of the liquid. It may be ejected by gravity, by gaseous pressure or by mechanical means capable of applying force sufficient to accomplish the desired subdivision of the liquid.

Referring now to superphosphate as one example of a fertilizer which may be treated in accordance with my invention, in carrying out the invention, the superphosphate may be spread on a considerabe surface or on a conveyor, or it may be disposed in a suitable mixing machine designed to insure thorough agitation and consequent exposure of the particles of the mass to the aqua ammonia supplied in the form of a mist or spray. The mist or spray of aqua ammonia produced as hereinbefore described, may be directed upon the superphosphate so as to thoroughly distribute the ammonia throughout the mass, avoiding excessive concentration in any portion thereof. In the event that a conveyor is used, the nozzle may be directed onto the material carried thereby, so that the aqua ammonia is disseminated over the thin layer of the material continuously as it travels past the point at which the spray is applied, the operation being thus made continuous and consequently economical.

I preferably treat the superphosphate material with aqua ammonia substantially the equivalent of 2 moles of ammonia per mole of mono-calcium phosphate, and in addition 2 moles of ammonia per mole of any free phosphoric acid present and sufficient ammonia to neutralize other free acid which may be present, such as sulfuric acid. By my method objectionable "puddling" or "balling" does not occur, reversion to the unavailable "citrate insoluble" phosphate is controlled and the value of the phosphate is preserved while the fertilizer is materially enriched in available nitrogen. The product is a granular or friable material suitable for application as a fertilizer.

The invention may be applied to superphosphate and to the usual mixtures thereof with other fertilizer constituents well-known in the art, and to other fertilizers containing mono-calcium acid phosphate, and various changes may be made in the constituents and proportions of such mixtures and in the amount of aqua ammonia added thereto without departing from the invention as defined in the claims appended hereto.

I claim:

1. The method of combining ammonia with superphosphate which comprises conveying the phosphate in a thin layer and spraying it with aqua ammonia.

2. The method of combining ammonia with a material containing mono-calcium acid phosphate, which comprises conveying said material in a thin layer and spraying it with aqua ammonia.

3. The process of reacting mono-calcium acid phosphate with ammonia which comprises applying to a solid material containing said mono-calcium acid phosphate an ammoniacal liquid in the form of a spray substantially uniformly distributed to the several particles of said solid material and supplying said liquid in amount sufficient to react with said mono-calcium acid phosphate to form citrate soluble calcium phosphate.

4. The method of reacting ammonia with superphosphate material which comprises applying to said superphosphate material an ammoniacal liquid in the form of a spray substantially uniformly distributed to the several particles of said superphosphate material whereby excessive concentration of the ammonia in contact with the superphosphate is avoided and supplying said liquid in amount less than that which would cause substantial reversion of the superphosphate to citrate insoluble form.

EDWARD W. HARVEY.